United States Patent [19]

Yamamoto

[11] Patent Number: 4,704,179
[45] Date of Patent: Nov. 3, 1987

[54] PROCESS FOR PRODUCING MAGNETIC DISCS

[75] Inventor: Nobuyuki Yamamoto, Kanagawa, Japan

[73] Assignee: Fuji Photo Film Co., Ltd., Kanagawa, Japan

[21] Appl. No.: 831,731

[22] Filed: Feb. 21, 1986

[30] Foreign Application Priority Data

Feb. 21, 1985 [JP] Japan .................................. 60-31603

[51] Int. Cl.⁴ ............................................ B32B 31/04
[52] U.S. Cl. .................................. 156/292; 156/275.1; 156/308.4; 360/133; 360/135; 428/694
[58] Field of Search ............... 428/63.5, 694; 360/133, 360/135; 156/160, 163, 229, 297, 212, 292, 295, 299, 275.1, 275.3, 308.4

[56] References Cited

U.S. PATENT DOCUMENTS 3,373,413  3/1968  Treseder .............................. 340/174
3,537,083 10/1970  Voth ..................................... 340/174
4,365,257 12/1982  Gerfast ............................. 346/135.1

Primary Examiner—Donald E. Czaja
Assistant Examiner—Merrell C. Cashion, Jr.
Attorney, Agent, or Firm—Sughrue, Mion, Zinn, Macpeak & Seas

[57] ABSTRACT

A process for producing a magnetic disc comprises (1) attaching a flexible disc having a magnetic layer coated thereon to at least one side of a base plate wherein a gap is formed between the back surface of the flexible disc and the base plate and (2) heat-treating the magnetic disc after attaching the flexible disc to the base plate.

9 Claims, 2 Drawing Figures

PROCESS FOR PRODUCING MAGNETIC DISCS

FIELD OF THE INVENTION

This invention relates to a process for producing a magnetic disc (or magnetic recording disc) which is used for magnetic recording in a planar direction or perpendicular direction.

BACKGROUND OF THE INVENTION

In the field of magnetic discs, there is a so-called rigid magnetic disc and as a base plate for the magnetic disc, a rigid material having less flexibility is used. For example, an aluminum plate (e.g. JIS A5086) is usually used as a base plate for the rigid magnetic disc.

Such a rigid magnetic disc is ordinarily produced by grinding an aluminum plate using a grinding machine to reduce spacing between the surface of the aluminum plate and a magnetic head in the case of using the aluminum plate for magnetic disc so that high-density recording can be performed and thereafter forming thereon a magnetic layer by vapor deposition, spin coating, etc. In this case, the surface of the aluminum plate is as smooth or flat as possible for enabling high-density recording or reproducing but it has hitherto been difficult to obtain a surface of less than 0.1 $\mu$m in a center line mean roughness Ra in the case a magnetic disc using a conventional aluminum base plate. Furthermore, since an aluminum base plate is lacking in flexibility, the web path, etc., are limited in the case of forming a magnetic layer on such an aluminum base plate, which makes the handling thereof greatly troublesome.

Moreover, high-density magnetic recording is greatly influenced by dust attached to the surface of a magnetic disc and hence it is required to make a magnetic disc with no such dust on the surface thereof. This makes the difficult production step of magnetic discs more troublesome and complicated as well as requiring large equipment costs.

On the other hand, since a conventional base plate, such as an aluminum plate, is rigid and has less flexibility, in the case of tracing a magnetic layer of a magnetic disc using such a base plate with a magnetic head, it is very difficult to maintain tracing with narrow spacing between the surface of the magnetic disc and the magnetic head, wherein errors in signal frequently occur.

Furthermore, when such a magnetic disc is traced with a magnetic head with narrow spacing, the sliding friction force is liable to be concentrate on the surface of the magnetic layer in contact with the magnetic head. Thus, since the base plate is rigid, surface breakage often occurs which shortens the life of the magnetic disc.

Still further, there is also a disadvantage that the ground aluminum base plate itself as described above is expensive.

On the other hand, recently, as shown in FIG. 1, a magnetic disc has been prepared by forming a concave portion on each of the surfaces of a disc base plate 1 and attaching a floppy disc or flexible disc having a magnetic layer on one surface thereof (hereinafter, such a disc having a magnetic layer is referred to as flexible disc) to each of the surfaces of the base plate 1 with the magnetic layer on the outside to provide a gap 3 between the back surface of the flexible disc 2 and the base plate 1.

The magnetic disc of this type is being watched with keen interest since the technique of flexible disc is applied as it is and a magnetic layer having smooth surface and high durability is used as the magnetic layers for the magnetic disc, which can eliminate the above-described disadvantages of a conventional magnetic disc.

As the results of various investigations on magnetic discs of this type, the inventors have discovered that a large problem exists in such magnetic discs. That is, when a magnetic disc is produced by simply attaching a flexible disc to each surface of a base plate as shown in FIG. 1, a so-called modulation, i.e. the ratio of the minimum output and the maximum output in one rotation of the magnetic disc becomes about 0.4 (as a matter of course, the ideal value of the modulation is 1 and it is better that the above-described ratio is as near to 1 as possible for best result). Accordingly, it is required to further improve the magnetic characteristics of magnetic discs of this type in order to put such to practical use.

SUMMARY OF THE INVENTION

An object of this invention is to provide a process for producing a magnetic disc of the above-described type having a modulation of near 1.

Another object of this invention is to provide a process for more easily producing at lower cost a magnetic disc which enables high-density recording, causes no signal error, and has good durability.

As the result of various investigations on eliminating the above-described disadvantages, it has been found that the cause thereof is in the anisotropy of the support of a flexible disc which is used for the magnetic disc, and, as the result of further investigations, it has been discovered that the aforesaid anisotropy can be reduced by applying heat treatment thereto.

That is, the invention is a process for producing a magnetic disc by attaching a flexible disc to at least one surface of a base plate with a gap between the back surface of the flexible disc and the base plate, which comprises heat-treating the magnetic disc after attaching the flexible disc to the base plate.

DESCRIPTION OF THE PREFERRED EMBODIMENT

Herein, the invention will be explained in detail.

Figure 1:
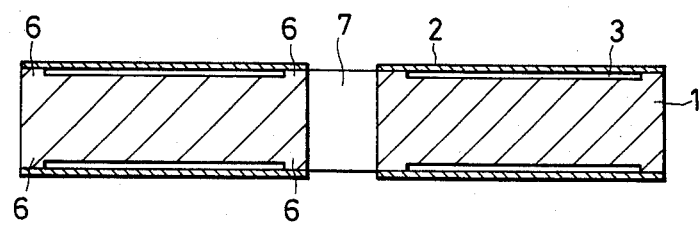
FIG. 1 is a schematic sectional view showning a magnetic disc of the type which is the subject of this invention.
Figure 2:
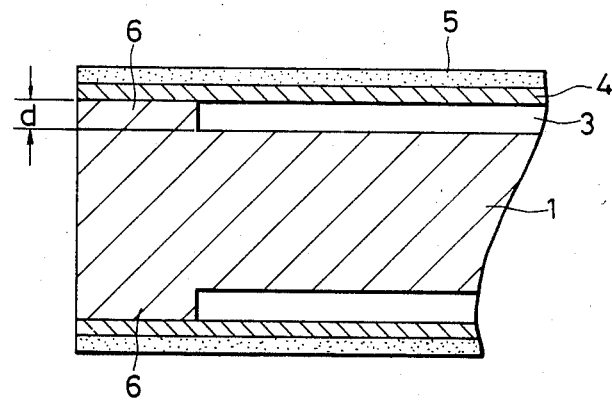
FIG. 2 is a partially enlarged view of the magnetic disc shown in FIG. 1.

A magnetic disc produced by the process of this invention is composed of a base plate 1 and a flexible disc 2 comprising a support 4 and a magnetic layer 5 attached to one surface or both surfaces of the base plate with a gap 3 between them as illustrated in FIG. 1 and FIG. 2. In addition, the magnetic disc has a central hole 7 for a rotary axis for rotating the magnetic disc.

For the flexible disc 2 used in this invention, materials which are used for so-called floppy discs can be employed. As the support for the flexible disc, plastic films such as polyethylene terephthalate films, etc., are used and a biaxially oriented polyethylene terephthalate film (PET film) is preferred. In particular, a biaxially oriented polyethylene terephthalate film which shows a shrinkage percent of lower than 0.2% and a shrinkage percentage difference between the length direction and the width direction of lower than 0.1%, preferably lower than 0.05% after being heat-treated for approximately 48 hours at about 70° C. in a state having formed thereon a magnetic layer is preferred.

Also, as the support for the flexible disc, it is preferred that the center roughness (Ra) of the support, at least on the side having a magnetic layer formed thereon, is less than 0.1 μm and by using such a support, the recording density of the magnetic disc as the final product can be increased.

In the case of the flexible disc, if both the surfaces of a support thereof are smoothed, the friction of the support is increased, whereby the support is liable to adhere to rolls, etc., or to each other and hence handling of the support in the production step of the support or the coating step of a magnetic layer on the support becomes difficult. Further, such a support is expensive.

On the other hand, if the surface of a support is rough, when a magnetic layer is formed on the surface of the support, spacing between the magnetic layer surface and a magnetic head is increased, which makes the magnetic disc unsuitable for high-density recording. Accordingly, it is preferred that a support has one smooth surface and one rough surface and that a magnetic layer is formed on the smooth surface thereof.

The magnetic layer 5 may be formed on a support by coating thereon a conventional magnetic coating composition comprising ferromagnetic iron oxide powders or ferromagnetic alloy powders, a binder, solvent, etc., or by a vacuum vapor deposition method, a sputtering method, an ion plating method, a plating method, etc.

The disc base plate for use in this invention generally has a sectional form as illustrated in FIG. 1 or FIG. 2. A concaved portion or gap 3 is formed for the dual purposes that (1) when a magnetic head is brought into contact with the surface of the magnetic layer 5, the friction applied to the magnetic layer 5 is dispersed, thus increasing the durability thereof, and (2) the magnetic layer 5 can be suitably brought into contact with a magnetic head, whereby spacing between the surface of the magnetic layer and the magnetic head can be narrowed to enable high-density recording. Accordingly, it is necessary that the depth d of the gap 3 is at least 0.1 mm. Furthermore, although the cause has not yet been clarified, the existence of the gap 3 reduces the influence of dust attached to the surface of the magnetic layer 5.

In addition, in the magnetic disc illustrated in FIG. 1 and FIG. 2, the inside and outside marginal portions 6 are horizontal but they may be inclined. Also, the inside diameter and the outside diameter of the base plate and the width of the marginal portions 6 can be optionally selected according to the intended use of the magnetic disc.

One requirement for the quality of the material of the disc base plate 1 is first that the material does not undergo heat deformation upon heat treatment as applied in accordance with this invention.

With this requirement in mind, as the material for the base plate, a metal such as aluminum, an aluminum alloy, etc., glass, or a polymer which undergoes substantially no heat deformation upon heat treatment, or a combination of them is used.

Another requirement is that the production cost is low. In this invention, even when a metal such as, for example, aluminum is used as the base plate, the magnetic layer is not influenced by the surface roughness of the base plate as will be seen from FIG. 1 and hence grinding for the base plate is not so precisely required, resulting in cost savings.

A polymer base plate is generally inexpensive since such base plates can be produced in large quantities by injection molding.

Furthermore, as a polymer which undergoes substantially no heat deformation upon heat treatment, a crystalline polymer having excellent heat resistance or a crystalline polymer having a glass transition point of higher than 120° C. is preferred. Specific examples of the polymer which can be used for the base plate are polycarbonate, polyphenylsulfide, polysulfide, poluimide, polysulfone, polyacrylate, polyethersulfone, polyethylerimide, polyether ether ketone, etc.

In addition, for reducing the thermal expansion coefficient of the polymer base plate, a metal oxide such as $RiO_2$, $SiO_2$, etc., $BaSO_4$, or glass fibers may be incorporated in the polymer in an amount of about 5 to 35% by weight.

The thickness of the base plate in this invention is about 1 to 5 mm and the thickness of the flexible disc is about 10 to 100 μm. Since the dimensional stability of a magnetic disc is influenced by the thickness and dimensional stability of the base plate, it is preferred to select a material for the base plate having a good dimensional stability.

Since aluminum is usually employed as the material for the arm of a magnetic head, it is preferred that the thermal expansion coefficient of the base plate is near that ($2.4 \times 10^{-5}$/°C.) of aluminum and the moisture absorption expansion coefficient is less.

A flexible disc is attached to the above-described base plate and as an adhesive for attaching such a heat curing type adhesive, a radiation curing type adhesive, such as electron beam curing type or ultraviolet curing type adhesive, etc., can be used.

When adhering the flexible disc to the base plate, it is preferred for facilitating adhesion to apply a subbing treatment using a polymer such as polyester, polycarbonate, etc., or a physical surface treatment such as corona discharging, glow discharging, flame treatment, etc., to one or both surfaces.

The magnetic disc thus prepared by attaching the flexible disc to the base plate is heat-treated in order to remove the anisotropy of the support of the flexible disc according to this invention.

The temperature for the heat treatment is preferably from about the glass transition point of the support for the flexible disc to about 120° C. and the time for the heat treatment may range from about 24 hours to about 3 seconds according to the temperature. Preferably, the heat treating is from abcut 1 minute to about 12 hours, more preferably, from about 1 hour to about 6 hours. After the heat treatment, the magnetic disc is cooled to a room temperature.

By heat treating the magnetic disc at a temperature higher than the glass transition temperature of the support, internal heat stress (heat shrinkage stress) can occur and by cooling the magnetic disc after the heat treatment, the stress relaxation can be frozen to improve the flatness of the magnetic disc.

Furthermore, preferably, at least one pinhole-shaped air hole is provided between the gap 3 of FIG. 1 and the atmosphere. The air hole has an effect that the pressure in the gap can be maintained to be equal to the atmospheric pressure so that an evenness which may be caused by the inflation or contraction of the air in the gap due to the temperature change of the atmosphere, does not occur on the flexible disc. Also, the air hole prevents that the pressure in the gap is raised by the contact friction. The diameter of the air hole is preferably 0.1 to 1 mm.

In the case of using PET as the support for the flexible disc, the glass transition temperature is generally about 69° C. and hence a sufficient effect can be obtained by heat-treating at temperature higher than about 70° C.

On the other hand, if the heat-treatment temperature is over about 120° C., the magnetic layer surface of the flexible disc is liable to roughen and thus such a high heat-treatment temperature is not preferred.

The following example is intended to illustrate this invention but is not intended to limit the scope of such in any way.

EXAMPLE

Preparation of Flexible Disc

A magnetic liquid having the following composition was coated on one surface of a biaxially oriented polyethylene terephthalate film of 75 μm in thickness so that the thickness of the magnetic layer after drying and calendering became 1.5 μm, dried, and calendered to form a magnetic layer and a doughnut-shaped disc sheet was cut from the film to provide a flexible disc.

| Composition of Magnetic Liquid: | |
| --- | --- |
| Y-$Fe_2O_3$ | 300 parts by weight |
| Polyvinyl chloride-vinyl acetate copolymer (VYHH, trade name, made by Union Carbide and Carbon Co.) | 40 parts by weight |
| Epoxy resin (Epikote, trade name, made by Shell Chemical Co.) | 40 parts by weight |
| Polyamide (Versamide 115, trade name, made by General Motors Corporation) | 20 parts by weight |
| Methyl isobutyl ketone/ xylol (2/1) | 800 parts by weight |

The shrinkage percentage of the film having the magnetic layer after heat treatment for 48 hours at 70° C. was 0.2% and the difference in shrinkage between the lengthwise direction and the width direction was 0.1%.

Preparation of Base Plate

On the other hand, a base plate composed of polyetherimide and 30% glass fibers contained therein was formed by injection molding. The form of the base plate was as shown in FIG. 1. The outside diameter and the inside diameter of the base plate were 130 mm and 40 mm, respectively and the width of each of the marginal portions for attaching the flexible disc was 2 mm. Also, the thickness of the base plate was 2 mm and the depth of the concave portion or gap 3 was 0.25 mm. A heat-curable epoxy adhesive was applied to the marginal portions of the base plate and the flexible discs each having the magnetic layer were adhered to both sides of the base plate. Then, the adhesive was cured for 24 hours at room temperature.

By the manner as described above, six magnetic discs were prepared. Five of the samples thus obtained were heat-treated under the conditions shown in the following table (one of them was not heat-treated). Regarding the samples thus prepared, the modulation, i.e., the ratio b/a of the minimum output b to the maximum output a in one rotation of the magnetic disc and the surface roughness (Ra) of the magnetic layer surface were measured.

The results thus obtained are shown in Table 1.

TABLE 1

| | Change of Modulation and Surface Roughness (Ra) Under Each Condition | | |
| --- | --- | --- | --- |
| Sample No. | Heat-Treatment Condition | Modulation b/a | Surface Roughness (Ra) |
| 1 | 60° C. 10 hr. | 0.52 | 0.09 μm |
| 2 | 70° C. 10 hr. | 0.92 | 0.06 μm |
| 3 | 80° C. 10 hr. | 0.98 | 0.06 μm |
| 4 | 120° C. 10 hr. | 0.82 | 0.07 μm |
| 5 | 130° C. 10 hr. | 0.48 | 0.11 μm |
| 6 | none | 0.40 | 0.10 μm |

As is clear from the results shown in the above table, it can be seen that the samples heat-treated according to this invention show good flatness as measured by surface roughness (Ra) and good contact with the magnetic head as compared with the comparison sample without being heat-treated and also when the heat treatment temperature is over 120° C., the surface is roughened, thus reducing the modulation.

What is claimed is:

1. A process for producing a magnetic disc comprising (1) attaching a flexible disc comprising a bi-axially oriented flexible polyethylene terephthalate film support having a magnetic layer coated thereon to at least one side of a base plate wherein a gap is formed between the back surface of the flexible disc and the base plate and, then, (2) heat-treating the magnetic disc at a temperature in the range of from about 70° C. to about 120° C. for 3 seconds to about 24 hours.

2. The process for producing a magnetic disc as claimed in claim 1, wherein the base plate is composed of a metal, glass, or a polymer which undergoes substantially no thermal deformation upon heat-treatment, or a combination of these materials.

3. The process for producing a magnetic disc as claimed in claim 1, wherein the depth of the gap is at least 0.1 mm.

4. The process for producing a magnetic disc as claimed in claim 1, wherein the surface roughness (Ra) of the surface for the flexible disc at the side having a magnetic layer coated thereon is less than 0.1 μm.

5. The process for producing a magnetic disc as claimed in claim 1, wherein the modulation b/a is between 0.98 and 0.82.

6. The process for producing a magnetic disc as claimed in claim 1, wherein the heat treating is from 1 minute to 12 hours.

7. The process for producing a magnetic disc as claimed in claim 1, wherein the heat treating is from 1 hour to 6 hours.

8. The process for producing a magnetic disc as claimed in claim 1, wherein at least one air hole is provided between said gap and the atmosphere.

9. The process for producing a magnetic disc as claimed in claim 8, wherein the diameter of said air hole is from 0.1 to 1 mm.

* * * * *